United States Patent [19]
McGinn

[11] Patent Number: 5,289,106
[45] Date of Patent: Feb. 22, 1994

[54] ELECTRICAL SUPPLY SYSTEM FOR LOW CURRENT LOADS

[76] Inventor: Thomas McGinn, 11 Ewenfield Avenue, Ayr, KA7 2OL, Scotland

[21] Appl. No.: 655,384

[22] PCT Filed: Aug. 21, 1989

[86] PCT No.: PCT/GB89/00969
§ 371 Date: Feb. 11, 1991
§ 102(e) Date: Feb. 11, 1991

[87] PCT Pub. No.: WO90/02436
PCT Pub. Date: Mar. 8, 1990

[30] Foreign Application Priority Data
Aug. 24, 1988 [GB] United Kingdom ............... 8820140

[51] Int. Cl.⁵ ............................ H02K 7/18; F21S 9/04
[52] U.S. Cl. .................................. 322/35; 307/84; 310/104; 403/DIG. 1
[58] Field of Search ............... 310/103, 104, 108; 403/DIG. 1; 322/35; 307/84

[56] References Cited

U.S. PATENT DOCUMENTS

| | | | |
|---|---|---|---|
| 3,353,028 | 11/1967 | Braikevitch et al. | 290/52 |
| 3,683,255 | 8/1972 | Schroeder | 320/2 |
| 3,921,052 | 11/1975 | Milano | 322/35 X |
| 4,208,592 | 6/1980 | Leibow et al. | 322/35 X |
| 4,304,534 | 12/1981 | McCoy | 310/104 X |

FOREIGN PATENT DOCUMENTS

| | | |
|---|---|---|
| 502350 | 7/1930 | Fed. Rep. of Germany . |
| 1215885 | 12/1970 | United Kingdom . |
| 8203260 | 9/1982 | World Int. Prop. O. . |

*Primary Examiner*—R. J. Hickey
*Attorney, Agent, or Firm*—Cox & Smith Incorporated

[57] ABSTRACT

An electrical supply system (10) for use with low current loads (12) disposed in hazardous areas, is described. Electricity is supplied to the low current load (12) from a local source (46) in response to mechanical energy from a fluid medium supplied from a remote pressure source (24).

16 Claims, 6 Drawing Sheets

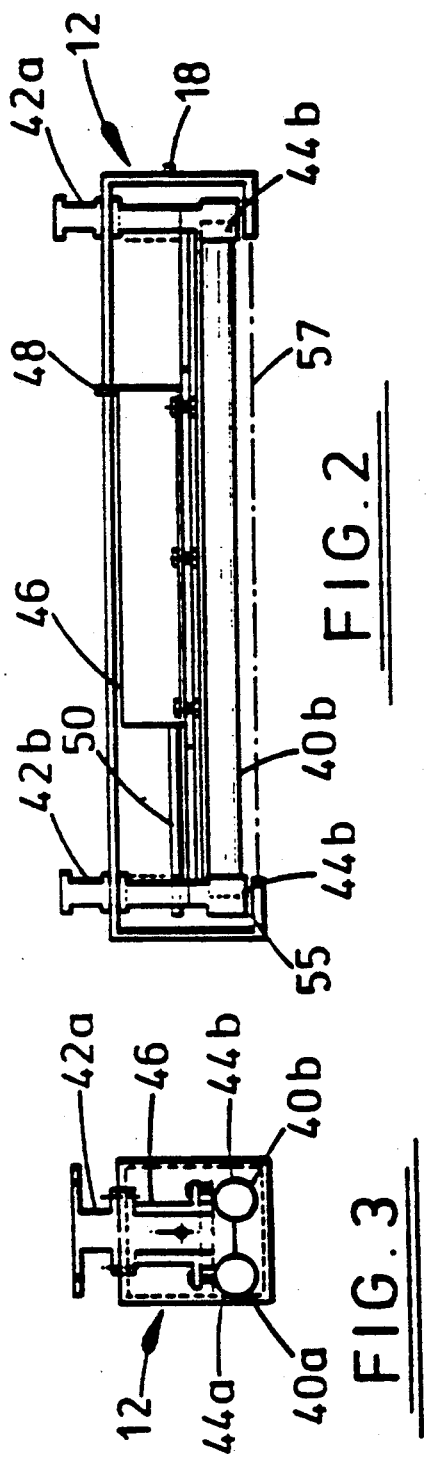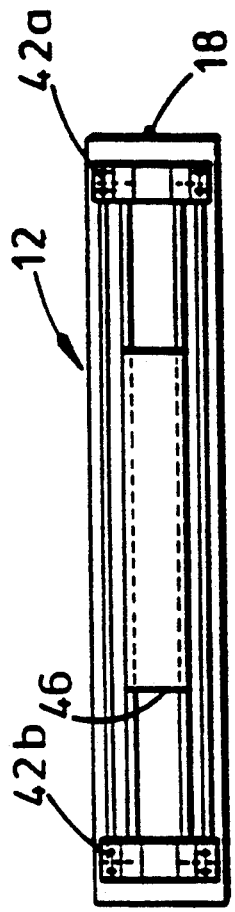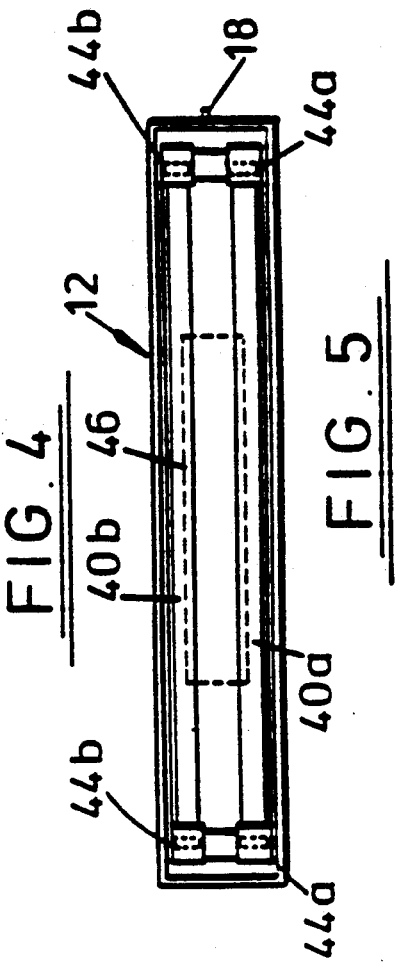

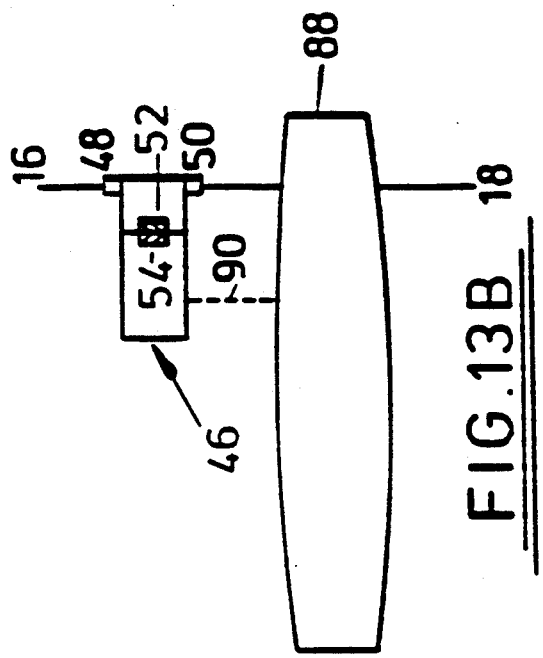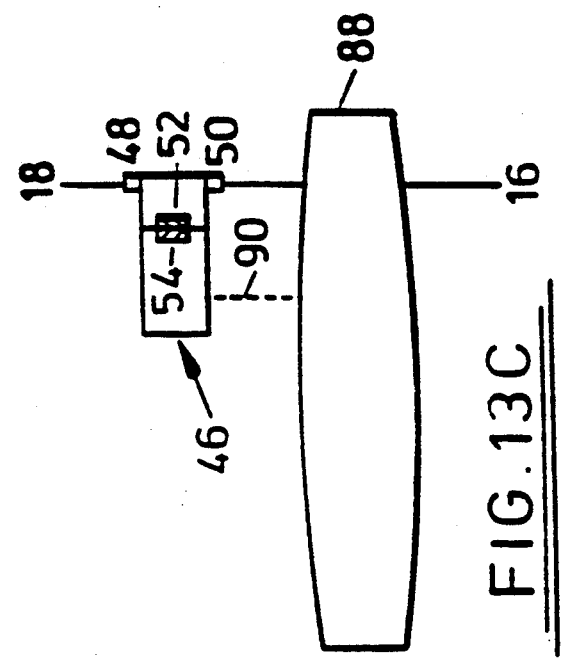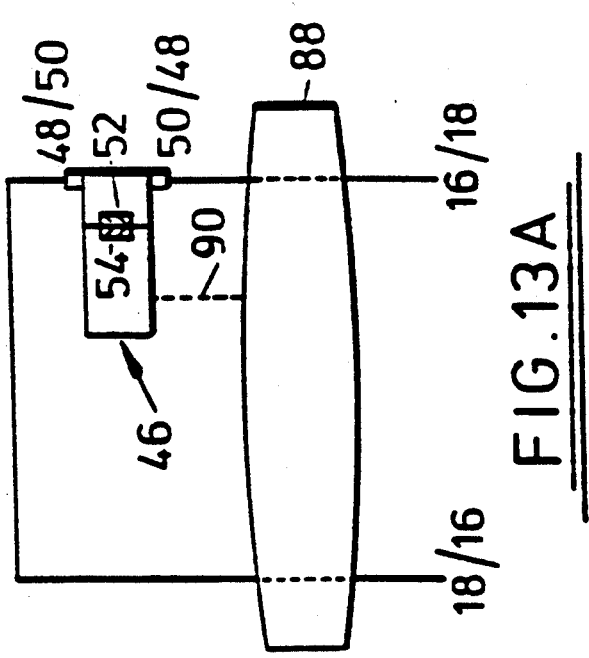

ELECTRICAL SUPPLY SYSTEM FOR LOW CURRENT LOADS

The present invention relates to an electrical supply system for low current loads and particularly, but not exclusively to such an electrical supply system for use with low current loads disposed in hazardous areas.

When an electrical supply system is disposed in a hazardous area, there is always numerous cables, junction-boxes and glands and the like disposed within the hazardous area. During failure of such electrical equipment, for example during an emergency, each of these cables, junction-boxes and glands are susceptible to primary and/or secondary means of sparking. Such sparking can be particularly dangerous in hazardous areas and therefore conventional electrical supply means can provide a relatively high potential risk to the user.

It is desirable that electrical equipment used in a hazardous area should be disposed within a flameproof enclosure. Such an enclosure should be able to withstand, without damaging the equipment, an explosion of flammable gas or vapour. Such explosions may occur in hazardous areas and it is desirable that the equipment should operate to its usual rating in such conditions. The flameproof enclosure should also prevent the transmission of flame such as would ignite flammable gases or vapours in the surrounding atmosphere. It is also desirable that the flameproof enclosure should be ventilated by a purging stream of dry air or inert gas to provide a plenum of safe atmosphere.

It is an object of the present invention to provide an electrical supply system which obviates or mitigates at least one of the aforementioned problems.

This is achieved by providing an electrical supply system (a.c. or d.c.) from a local source in response to mechanical energy from a fluid medium supplied from a remote pressure source.

In one embodiment electrical energy for fluorescent lighting is provided by an alternator, the rotor of which is coupled to and driven by an impeller. Compressed air from a remote source is fed to the blades of the impeller causing the impeller to rotate and provide kinetic energy to the rotor. Several lights are connected in parallel.

According to a first aspect of the present invention there is provided an electrical supply system for supplying electricity to a low current load, said electrical supply system comprising compressor means for generating pressure in a fluid medium a housing coupled to said compressor means by flow and return conduits, said housing containing energy conversion means for converting energy of said fluid medium to electricity, said energy conversion means including a rotatable impeller for receiving said fluid medium and for converting energy in said fluid medium into rotational energy, first magnet means coupled to said impeller, second magnet means spaced apart from said first magnet means, said first and said second magnet means being spaced apart along, and rotatable about, a common axis of rotation, said first and second magnet means forming a magnetic coupling whereby said rotational energy of said impeller is transferred to said second magnet means, and an alternator coupled to said second magnet means for converting the rotational energy of said second magnet means into electrical energy for supply to said low current load.

Conveniently said fluid means is compressed air.

Alternatively said fluid medium is a compressed or pressurised gas. Alternatively also said fluid medium is a compressed or pressurised liquid.

Preferably said compressor means is located remotely from said low current load. Conveniently said conduits provide a path through which said medium is supplied to the blades of said impeller and a path through which said medium is returned to said compressor.

Preferably at least one fluid medium control element is mounted on each of the flow and return conduits. Conveniently said conduits are made of stainless steel or plastic.

Preferably said low current load is a light source. Conveniently said light source is a fluorescent light tube. Preferably also a plurality of said low current loads are connected in parallel.

According to a second aspect of the present invention there is provided an energy conversion device for providing electrical energy for a low current load, said energy conversion device comprising impeller means for receiving a fluid medium and for converting energy in said fluid medium into rotational energy, said fluid medium being supplied from a remote fluid medium source, first magnet means coupled to said impeller means, second magnet means spaced apart from said first magnet means, said first and said second magnet means being spaced apart along, and rotatable about, a common axis of rotation, said first and said second magnet means forming a magnetic coupling whereby said rotational energy of said impeller means is transferred to said second magnet means, and alternator means coupled to said second magnet means for converting said rotational energy of said second magnet means into electrical energy.

Preferably said impeller means is an impeller with a plurality of blades and, in use, said fluid medium is incident on the blades of said impeller to cause rotational movement of said impeller.

Conveniently said fluid medium is compressed air.

Alternatively said fluid medium is a compressed or pressurised gas or liquid.

Preferably a plurality of said low current loads are connected in parallel Conveniently said low current load is a light source.

According to a third aspect of the present invention combination with the accompanying drawings in which:

FIG. 2 is a front elevational view of a lighting unit for use in the system shown in FIG. 1;

FIG. 3 is a plan view of the lighting unit shown in FIG. 2;

FIG. 4 is a plan view of the top of the lighting unit shown in FIG. 2;

FIG. 5 is a plan view of the bottom of the lighting unit shown in FIG. 2;

FIGS. 13a–13c are diagrammatic views of three alternative arrangements of the electrical supply system shown in FIGS. 1 to 12.

Figure 1:
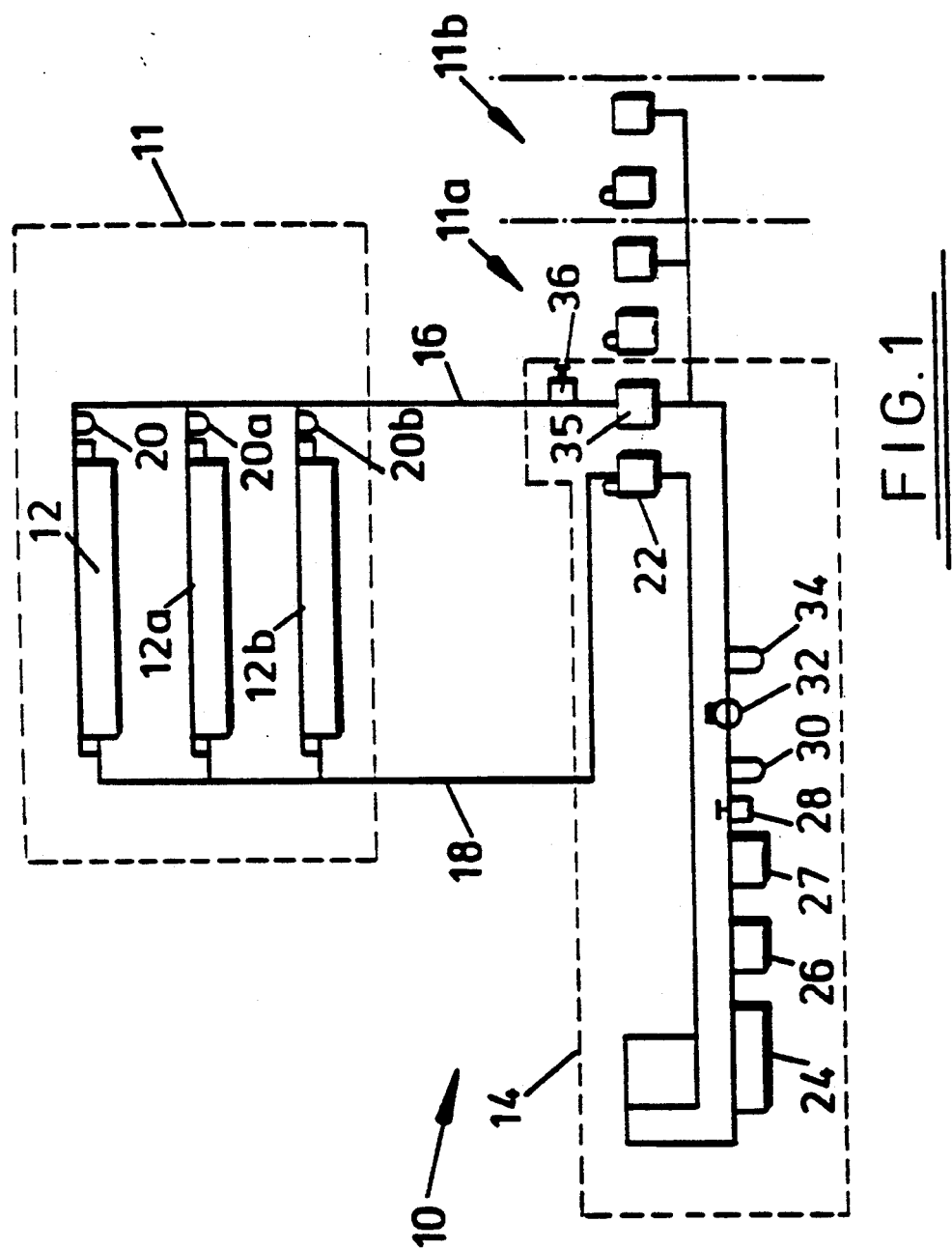
FIG. 1 is a diagrammatic view of an electrical supply system in accordance with the present invention.

Reference is firstly made to FIG. 1 of the drawings, which shows an electrical supply system generally indicated by reference numeral 10. The supply system 10 provides an electrical supply for low current loads such as fluorescent strip lighting disposed in a hazardous area 11. The supply system 10 comprises identical lighting units 12, 12a and 12b connected in parallel. The lighting units 12, 12a and 12b are operated from a remote location 14 outwith the hazardous area 11 as will be described. Compressed air, supplied from the remote location 14 to the lighting units 12, 12a and 12b causes these lighting units to be energised to supply light as will also be described.

The compressed air is supplied from a compressed air supply and control system 14 located remotely to the lighting units 12, 12a and 12b along a first stainless steel pipe 16. When the compressed air is received by the lighting units 12, 12a and 12b the compressed air drives a generator disposed within each unit 12, 12a and 12b and the air eventually expands and returns to the remote compressor 24 along second stainless steel pipe 18. Water traps 20, 20a and 20b are located adjacent lighting unit 12, 12a and 12b respectively to trap water contained in the compressed air. In particular the compressed air from compressor 24, which can attain pressures up to 1000 p.s.i., passes through drier 26 before entering an air receiver 27 and a series of pressure regulation elements.

The air receiver 27 output passes through a first pressure regulator 28, an oil trap 30, pressure gauge 32 and a water trap 34 before reaching a pressure regulator control panel 35. The oil trap 30 and water trap 34 ensure that the compressed air supplied to pipe 16 is relatively clean. The pressure gauge 32 provides an indication of the pressure of the compressed air in the system. Pressure regulator control panel 35 allows control of the pressure valve of the compressed air supplied to pipe 16. The compressed air supplied to pipe 16 passes through a second regulator 36 before entering pipe 16. The pressure gauge 32 is connected to an alarm system (not shown) and the flow of compressed air may be shut down in an over-pressure situation by closing regulators inside control panels 22 and 35. Similarly if pressure gauge 32 gives an indication of under-pressure in the system, regulators inside 22 and 35 are also closed. The pressure of compressed air supplied to pipe 16 must be sufficient to allow lighting units 12, 12a and 12b to be driven in a manner as will be described. The air returned along pipe 18 passes through pressure drop control panel 22 which provides control of the pressure of expanded air entering compressor 24. The air is again compressed and treated and then passed to the lighting units 12 as described above.

Similar lighting systems designated 11a, 11b can be operated in parallel with 11 from the remote compressed air supply and control system 14. The number of lighting units which may be used is determined by the output pressure of the compressor 24 and the pressure capabilities of the pipes.

Reference is now made to FIGS. 2 to 5 of the drawings which are various views of the lighting unit 12 shown in FIG. 1. The lighting unit 12 comprises two fluorescent lighting tubes 40a and 40b mounted on cast iron brackets 42a and 42b which permit the unit 12 to be suspended from a ceiling. The brackets 42a and 42b are constructed to substantially withstand any vibrations created by the force of the compressed air driven system and by explosions in the hazardous area. Tubes 40a and 40b have electrical connections 44a and 44b respectively which allow the fluorescent tubes to be energised by electrical signals emitted from a pneumatic—electric conversion unit 46 mounted above the tubes 40a, 40b. Each lighting tube 40a, 40b has a rating of 60 Watts. When operated from a generator providing a 110 volt output, each tube 40a, 40b requires approximately 0.5 amps of current. As best seen in FIG. 2, unit 46 two external connections either of which can be connected to supply pipe 16 or return pipe 18. The compressed air can enter unit 46 through pipe connection 46 and leave through pipe connection 48, or can enter through pipe connection 48 and leave through pipe connection 46. However, for the purpose of explanation the diagrams show one direction of flow only. Pipe connection 46 is designated as an inlet pipe connection and is coupled to inlet pipe 16 and pipe connection 48 is designated as an outlet connection and is coupled to outlet pipe 18. When compressed air from pipe 16 enters unit 46 via inlet 48, the compressed air rotates a generator which generates electricity, as will be described in detail.

Figure 6:
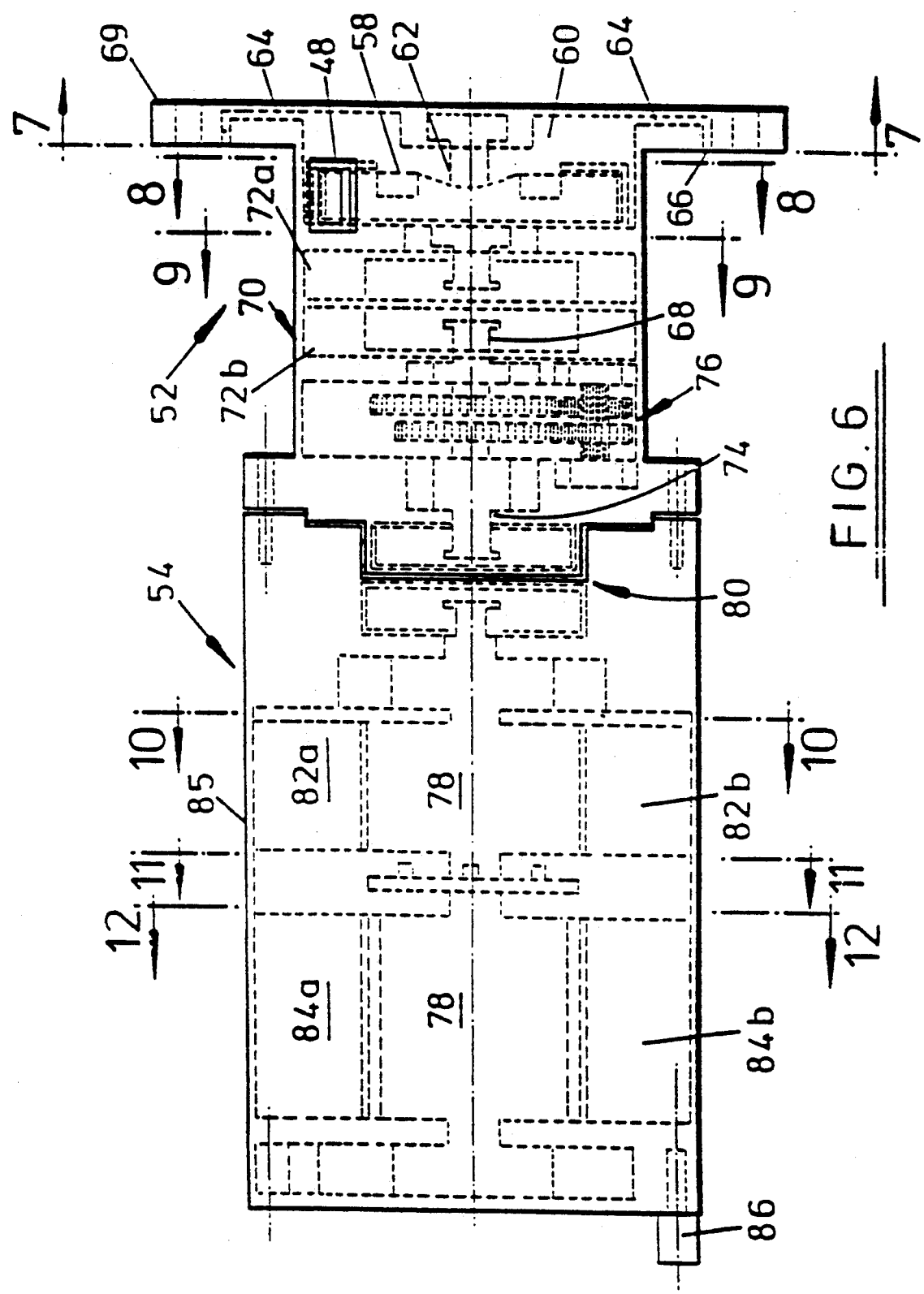
FIG. 6 is a sectional view, drawn to a larger scale, of part of the lighting unit shown in FIGS. 2 to 5, and FIGS. 7 to 12 are cross-sectional views of FIG. 6 taken on lines 7—7 to 12—12 respectively.
Figure 7:
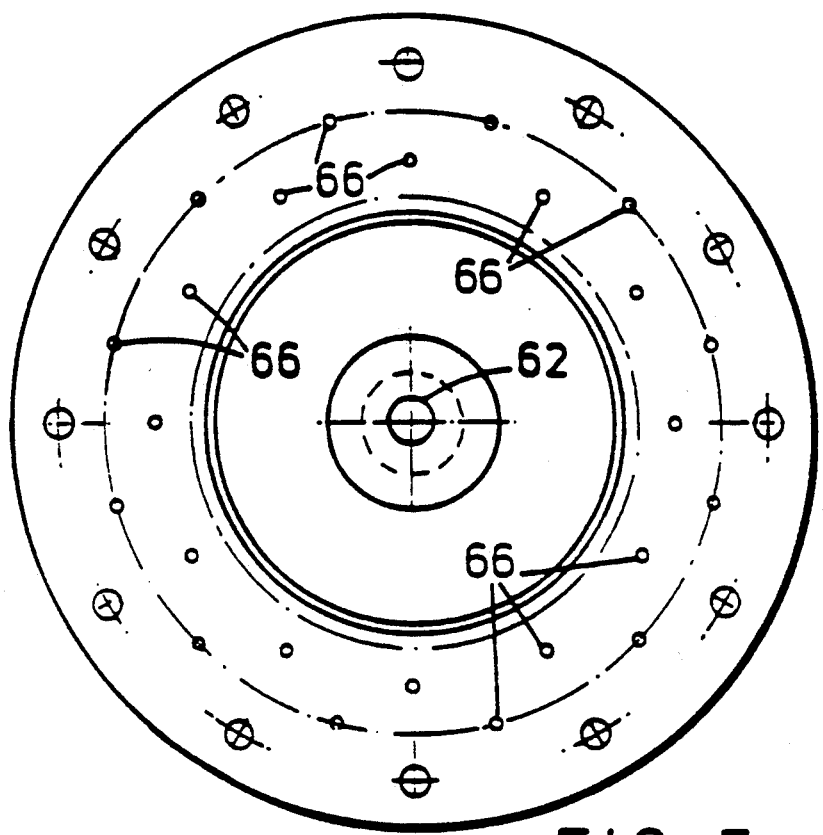
Figure 8:
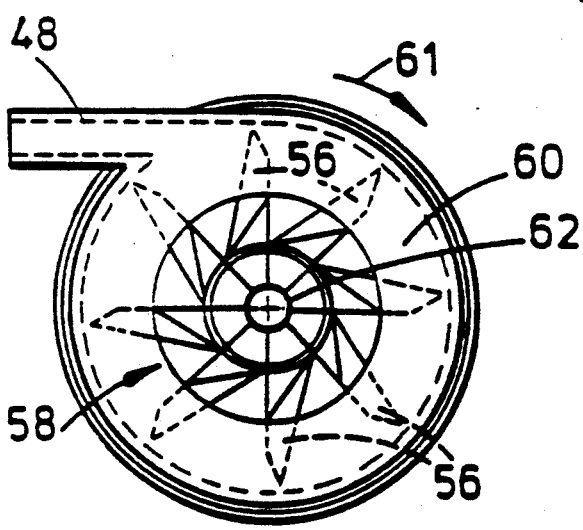
Figure 9:
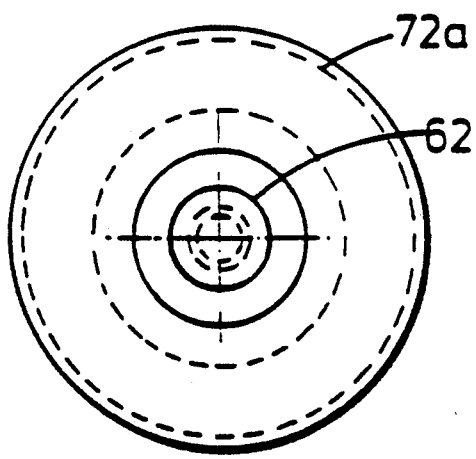
Figure 10:
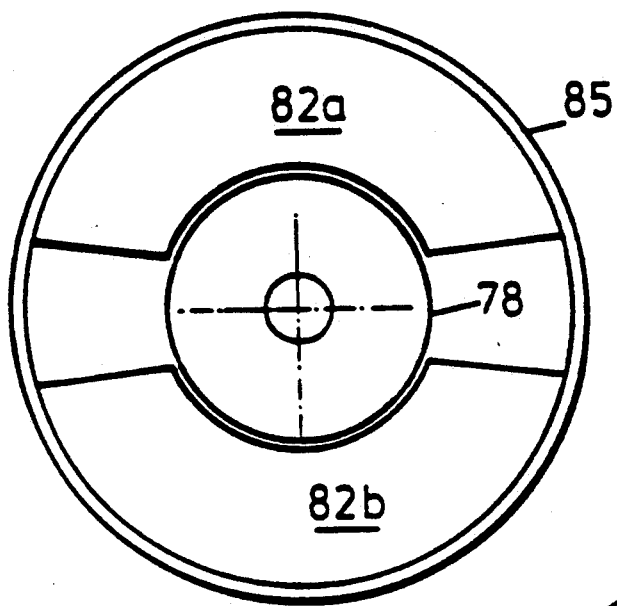
Figure 11:
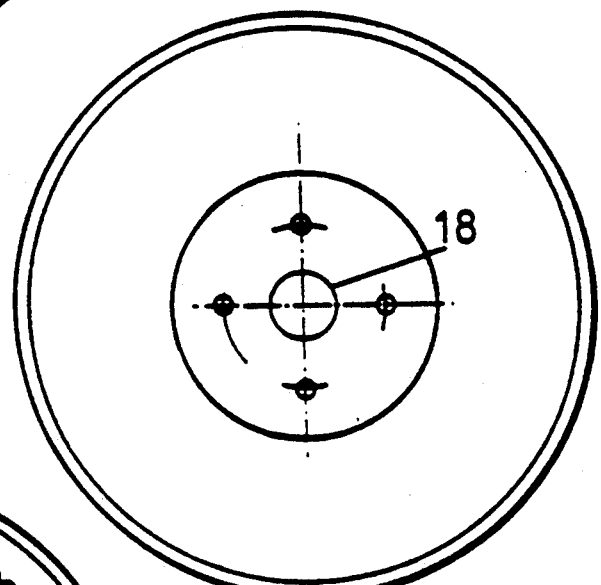
Figure 12:
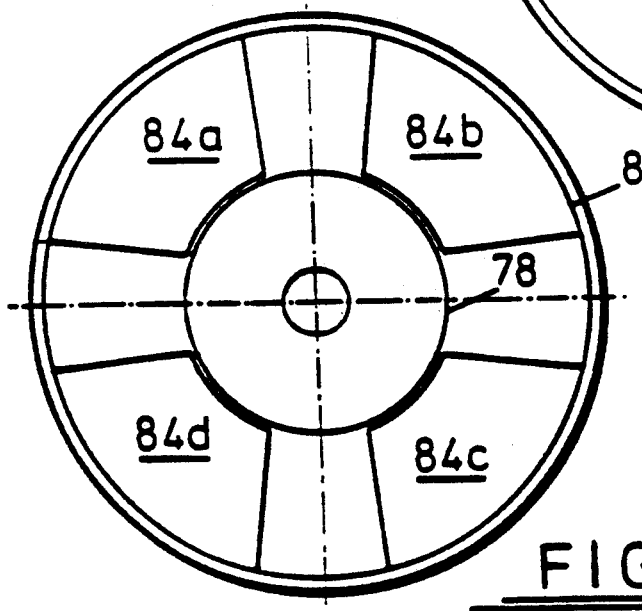

Reference is now made to FIG. 2 and FIGS. 6 to 12 of the drawings, FIG. 6 being an elevational view of part of the unit 46 drawn to a larger scale, and FIGS. 7 to 12 being various cross-sectional views taken on lines 7—7 to 12—12 of FIG. 6. The pneumatic-electrical conversion unit 46 contains within its housing an air pressure to rotary motion convertor, generally indicated by numeral 52 (FIG. 6), and a rotary motion to electrical energy convertor in the form of a single-phase brushless alternator, generally indicated by 54. The air pressure to rotary motion convertor 52 receives compressed air through inlet 48, the compressed air passes into a chamber 60 and is incident on the blades 56 of an impeller 58, best seen in FIG. 8, disposed in the chamber 60. The compressed air acts on the blades 56 of impeller 58, to rotate the impeller in the direction of arrow 61. This causes a corresponding rotation of a first shaft 62. The rotation of the impeller 58 provides constant output torque for shaft 62. The compressed air exits chamber 60 via channels 64 and exit holes 66 disposed around the circumference of circular plate 69, as best seen in FIGS. 6 and 7. This air flows along the outside of the convertor 52 and alternator 54 along pipe 50 over the surface of fluorescent tubes 40a, 40b above the screen 57 to help to cool the tubes and purge the system of existing surrounding atmosphere before being returned via tube 18 to the remote pressure source.

The stream of air passing over tubes 40a, 40b and above screen 57 provides the electrical elements within the unit 46 with a plenum of treated atmosphere. A sufficient flow of air within the lighting unit 12 provides a positive pressure which substantially removes any flammable gases within lighting unit 12. The positive pressure of the air flow also prevents flammable gases from entering the lighting unit 12. In the case of the failure of the pressurising air flow, a warning is given to allow suitable precautionary measures to be taken.

The first shaft 62 is coupled to a second co-axial shaft 68 via a magnetic coupling 70. Magnets 72a and 72b mounted on first and second shafts 62 and 68 respectively, cause second shaft 68 to rotate with first shaft 62 without slip. The magnetic coupling 70 of first and second shafts 62 and 68 minimises mechanical losses in the system and reduces the likelihood of any particles of dust and moisture entering gearing arrangement 76 and alternator 54.

Second shaft 68 is coupled to a third shaft 74 via a gearing arrangement 76. The gearing arrangement 76 ensures that third shaft 74 is driven to rotate an angular velocity sufficient to generate an adequate supply of electricity. The third shaft 74 is coupled to the rotor 78 of alternator 54 via a magnetic coupling 80 similar to that hereinbefore described. As the third shaft 74 rotates, the rotor 78 of alternator rotates with the third shaft 74 with minimal slip.

Permanent magnets 82 and 82b (best seen in FIG. 10) and stator coils 84a, 84b, 84c and 84d (best seen in FIG. 12) are mounted within the housing 85 of alternator 54. As rotor 78 rotates electrical signals are generated from the stator coils in a manner well known in the art. The rotor 78 is driven at such a speed and is constructed in such a manner as to induce acceptible exitation and output voltage to produce an uninterrupted power supply. The alternator incorporates voltage limit devices and is provided with double insulation. The electrical connections of the alternator 54 are not shown in the interest of clarity. An electrical output terminal 86 is mounted on alternator 54. This terminal 86 is connected to terminals 44a and 44b of fluorescent tubes 40a and 40b. Thus electrical signals generated at terminal 86 due to the rotation of rotor 78 cause fluorescent tubes 40a and 40b to be energised.

Reference is now made to FIGS. 13a to 13c of the drawings which show three alternative arrangements for the flow of compressed air through the unit 46 and through a certified appliance 88. It is understood that the certified appliance 88 is a low current load such as a lighting unit and that the electrical connections between unit 46 and appliance 88 are shown by dotted lines 90. Unit 46 provides a certified power supply for the certified appliance 88.

In the arrangement shown in FIG. 13A, the flow of compressed air from inlet 16 to outlet 18 passes through the certified appliance both before the compressed air flows into unit 46 and after the compressed air exits unit 46. As hereinbefore described, the inlet and outlet connections may be reversed. In the arrangement shown in FIG. 13B, the compressed air flows through unit 46 before flowing through the certified appliance 88 and in the arrangement shown in FIG. 13c the compressed air flows through the appliance 88 before flowing through the unit 46.

Various modifications may be made to the embodiment hereinbefore described without departing from the scope of the present invention. Any suitable compressed fluid may be used instead of compressed air. The brackets and control box of the lighting unit may be made of stainless steel. One of the magnetic couplings in the convertor or alternator may be replaced by a mechanical coupling.

Any low current load may be operated by the system, for example a clock. The alternator may be of the brush type if desired. The maximum load each pneumatic to electrical conversion unit can power is approxiately 500 Watts, and the maximum output current of each pneumatic to electrical conversion unit is approximately 5A. The permanent magnets of the alternator may be disposed in any suitable position for obtaining a desired electrical output and coils could be used in combination with the magnets to provide sufficient excitation energy. In addition to the purging of the system a separate, low pressure start line may be used to pre-purge the system. The system can also be adapted to be used with any apparatus or structure which is designed to be substantially "explosion proof".

Advantages associated with the present invention are that the electrical supply system is suitable for use in hazardous environments, class 1, group 1 and which is also independant of the purging system. The electrical equipment is disposed within a flameproof and substantially explosion proof enclosure. The probability of a dangerous gas surrounding a dangerous electrical condition is minimal. The system is completely independent and is constantly monitored and alarmed. As there are no junction boxes, cables or glands the chances of sparking are almost eliminated thus reducing the high potential risk of using electrical equipment in hazardous areas. In addition the system is almost maintenance free in as much as there are no servicable parts. This ensures that the original specification and tolerances are maintained.

I claim:

1. An electrical supply system for supplying electricity to a plurality of low current loads, said electrical supply system comprising:
   a plurality of low current loads, a fluid medium, compressor means for generating pressure in said fluid medium, flow and return conduits, a plurality of housings associated with said plurality of low current loads and coupled to said compressor means by said flow and return conduits, said housings containing energy conversion means for converting energy of said fluid medium to electricity, each said energy conversion means comprising a rotatable impeller for receiving said fluid medium and for converting energy in said fluid medium into rotational energy, first magnet means coupled to said impeller, second magnet means spaced apart from said first magnet means, said first and said second magnet means being spaced apart along, and rotatable about, a common axis of rotation, said first and said second magnet means forming a magnetic coupling whereby said rotational energy of said impeller is transferred to said second magnet means, and a generator coupled to said second magnet means for converting the rotational energy of said second magnet means into electrical energy for supply to said plurality of low current loads.

2. The electrical supply system of claim 1, wherein the fluid medium comprises compressed air.

3. The electrical supply system of claim 1, wherein the fluid medium comprises a compressed or pressurized gas.

4. The electrical supply system of claim 1, wherein the fluid medium comprises a compressed or pressurized liquid.

5. The electrical supply system of claim 1, further comprising a plurality of low current loads and wherein the compressor means is remotely located with respect to the low current load.

6. The electrical supply system of claim 1, wherein
   the conduits provide a path through which the medium is supplied to the blades of the impeller and a path through which the medium is returned to the compressor.

7. The electrical supply system of claim 1, wherein
   at least one fluid medium control element is mounted on each of the flow and return conduits.

8. The electrical supply system of claim 1, wherein the conduits are made of stainless steel or plastic.

9. The electrical supply system of claim 1, further comprising a plurality of low current loads and wherein the low current load comprises a light source.

10. The electrical supply system of claim 9, wherein the light source comprises a fluorescent light tube.

11. The electrical supply system of claim 1 and further comprising a plurality of low current loads connected in parallel to one another.

12. An energy conversion device for providing electrical energy for a plurality of low current loads, said energy conversion device comprising:

a plurality of low current loads, a fluid medium, a plurality of housings associated with said plurality of low current loads said housings comprising a remote source of said fluid medium, impeller means for receiving said fluid medium and for converting energy in said fluid medium into rotational energy, first magnet means coupled to said impeller means, second magnet means spaced apart from said first magnet means, said first and said second magnet means being spaced apart along, and rotatable about, a common axis of rotation, said first and said second magnet means forming a magnetic coupling whereby said rotational energy of said impeller means is transferred to said second magnet means, and a generator means coupled to said second magnet means for converting said rotational energy of said second magnet means into electrical energy for supply to said plurality of low current loads.

13. The energy conversion device of claim 12, wherein the fluid medium comprises compressed air.

14. The energy conversion device of claim 12, wherein the fluid medium comprises a compressed or pressurized gas or liquid.

15. The energy conversion device of claim 12 and further comprising a plurality of low current loads connected in parallel to one another.

16. A method of supplying electrical energy to a plurality of low current loads comprising the steps of:

supplying a fluid medium from a remote fluid medium source to a plurality of housings associated with a plurality of low current loads said housings having an energy conversion device comprising an impeller and a generator coupled together by first and second magnet means spaced apart along, and rotatable about, a common axis of rotation and forming a magnetic coupling, said having being disposed in close proximity to said plurality of low currently loads;

converting energy in said fluid medium into rotational energy by said impeller;

coupling the rotational energy of said impeller to rotate the first magnet means about said common axis and magnetically coupling the second magnetic means to rotate about the same axis whereby rotational energy is transferred from said impeller to said second magnet means and to said generator, and converting said rotational energy of said generator into electrical energy for supply to said plurality of low current loads.

* * * * *